J. WALTER.
INDICATING DEVICE.
APPLICATION FILED SEPT. 5, 1914.

1,142,645.

Patented June 8, 1915.
3 SHEETS—SHEET 1.

Witnesses
C. F. Rudolph
John J. McCarthy

Inventor
John Walter,
By Victor J. Evans
Attorney

J. WALTER.
INDICATING DEVICE.
APPLICATION FILED SEPT. 5, 1914.

1,142,645.

Patented June 8, 1915.
3 SHEETS—SHEET 2.

Witnesses
E. F. Rudolph
John J. McCarthy

Inventor
John Walter,
By Victor J. Evans
Attorney

J. WALTER.
INDICATING DEVICE.
APPLICATION FILED SEPT. 5, 1914.
1,142,645.
Patented June 8, 1915.
3 SHEETS—SHEET 3.
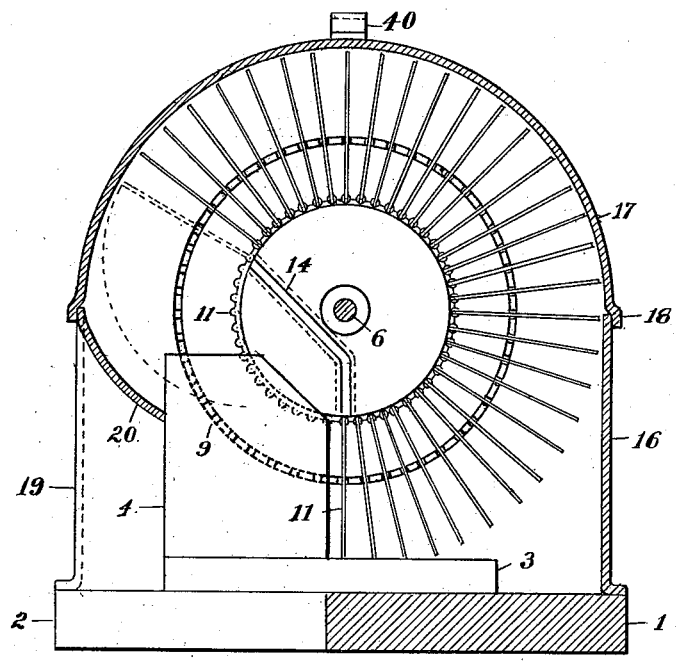
Fig. 4
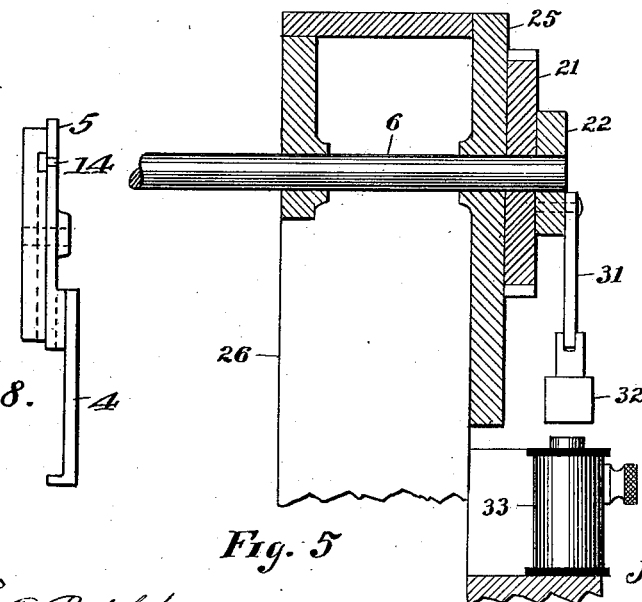
Fig. 8.
Fig. 5
Witnesses
C. F. Rudolph
John J. McCarthy
Inventor
John Walter,
By Victor J. Evans
Attorney

UNITED STATES PATENT OFFICE.

JOHN WALTER, OF PHILADELPHIA, PENNSYLVANIA, ASSIGNOR OF ONE-HALF TO FERDINAND HOTTER, OF PHILADELPHIA, PENNSYLVANIA.

INDICATING DEVICE.

1,142,645. Specification of Letters Patent. Patented June 8, 1915.

Application filed September 5, 1914. Serial No. 860,499.

*To all whom it may concern:*

Be it known that I, JOHN WALTER, a citizen of the United States, residing at Philadelphia, in the county of Philadelphia and State of Pennsylvania, have invented new and useful Improvements in Indicating Devices, of which the following is a specification.

This invention relates to improvements in indicating devices and has particular application to a street or station indicator.

In carrying out the present invention, it is my purpose to provide a street or station indicator which will be found especially useful on railway cars and which will operate automatically, as the car approaches each street or station, to advise the passengers of the name of such street or station.

It is also my purpose to provide an indicating device of the class described which will embody in its construction, among other features, a plurality of name plates radiating from a common axis and rotatable about such axis and means holding such plates normally against independent movement, such plates being inclosed by a casing formed with a sight opening tangential to the path of movement of the plates, means being provided for relieving the plates of the influence of the holding means so that the plates may drop into the sight opening one by one.

Furthermore, I aim to provide a station or street indicator which will embrace the desired features of simplicity, efficiency and durability, which may be installed and maintained at a minimum expense and which may be operated manually in the event of defect in the automatic operating mechanism.

With the above and other objects in view, the invention consists in the construction, combination and arrangement of parts hereinafter set forth in and falling within the scope of the claims.

Figure 1:
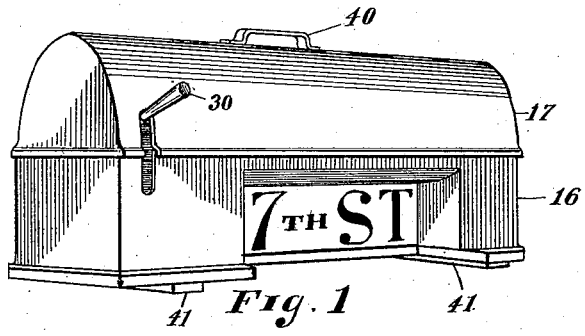
Figure 6:
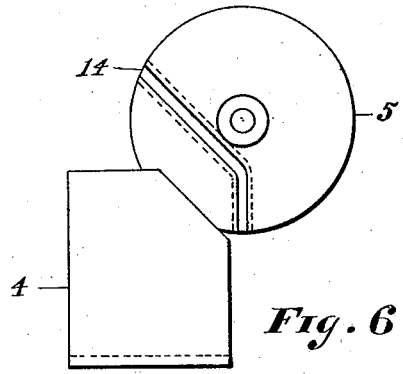
Figure 7:
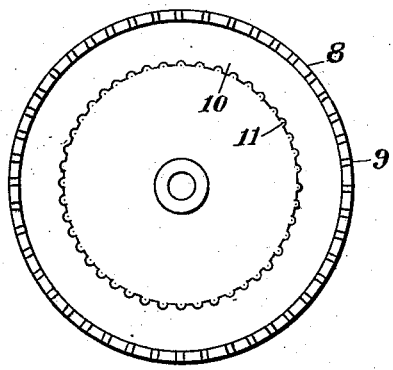
Figure 2:
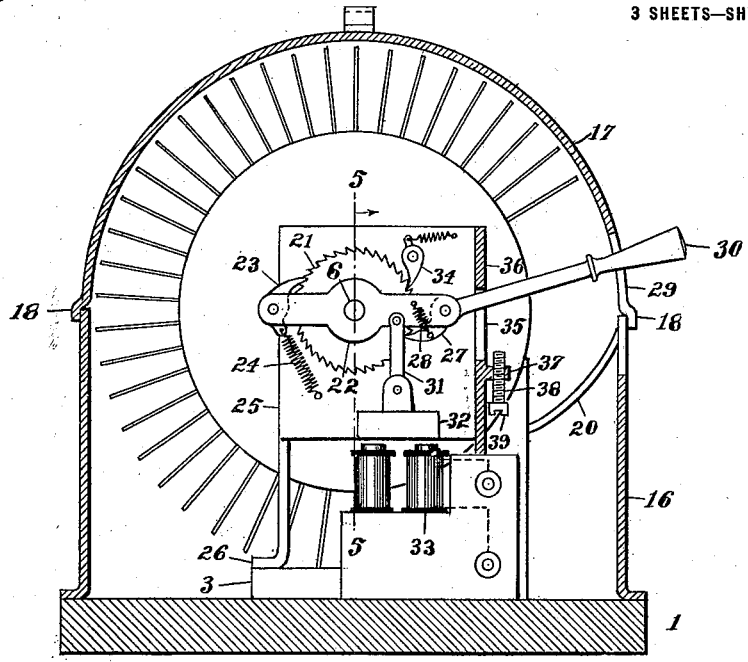
Figure 3:
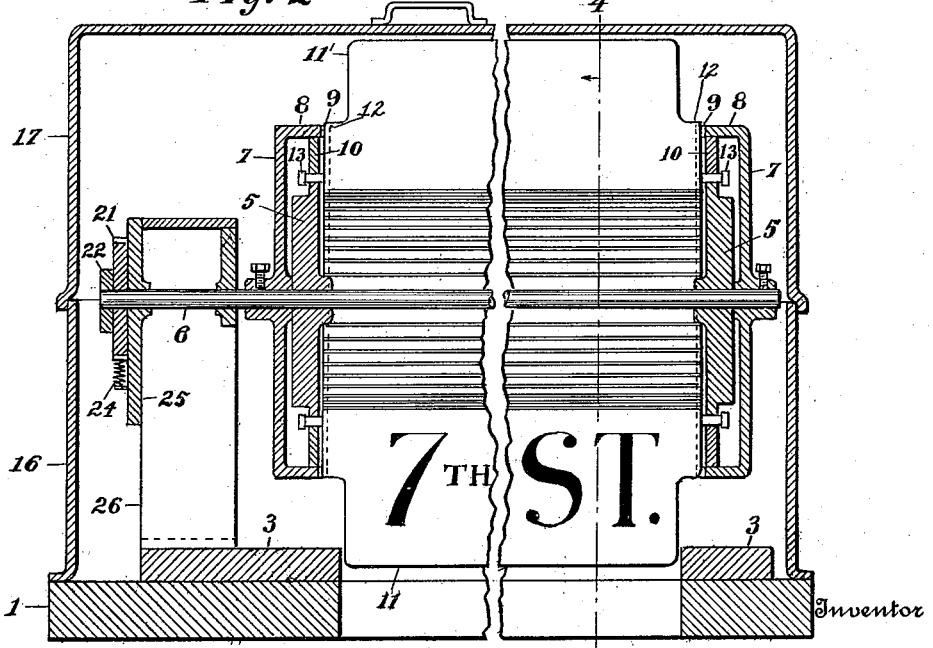

In the accompanying drawings, Figure 1 is a perspective view of a street or station indicator constructed in accordance with the present invention. Fig. 2 is a view in end elevation thereof, the end plate being removed. Fig. 3 is a vertical longitudinal sectional view therethrough. Fig. 4 is a vertical transverse sectional view on the line 4—4 of Fig. 3. Fig. 5 is an enlarged sectional view on the line 5—5 of Fig. 2. Fig. 6 is a face view of one of the stationary circular plates. Fig. 7 is a similar view of one of the rotatable disks. Fig. 8 is a view in edge elevation of a detail of the invention.

Referring now to the drawings in detail, 1 designates a base constructed of any suitable material and having one longitudinal edge cut out as at 2. Suitably fastened to the upper surface of the base at the opposite ends of the cut out portion 2 are supporting blocks 3, 3 and upstanding from the supporting blocks 3, 3 contiguous the end edges of the cut out portion 2 of the base are supporting standards 4, 4. Suitably fastened to or formed integral with the upper ends of the standards 4, 4 and set outwardly therefrom are circular plates 5, 5 spaced apart in parallelism. Journaled in horizontally alining bearings carried by the plates 5, 5 and arranged centrally thereof is a horizontal shaft 6. Fixed upon the shaft 6 at the outer sides of the circular plates 5, 5 and disposed concentrically of such shaft are annular disks 7, 7 each formed with an inwardly extending peripheral flange 8 having the inner edge thereof formed with notches 9 alining with the notches in the inner edge of the flange on the other disk, the flanges 8 being disposed concentrically of the plates 5 and spaced apart therefrom. Surrounding the periphery of each plate 5 is an annular disk 10 having the periphery thereof fastened to the inner side of the adjacent flange 8 and the inner edge thereof formed with notches 11, the notches 11 in one disk 10 alining with those in the other disk.

Arranged radially of the shaft 6 and disposed between the annular disks 10, 10 are name plates 11' each substantially rectangular in contour and having the opposite side edges at the inner longitudinal edge thereof formed with outwardly projecting lugs 12, 12 fitting in alining notches in the flanges 8, 8 and equipped with laterally projecting axially alining headed pins 13, 13 seated within alining notches 11 in the inner edges of the flanges 10, 10. These lugs 12 are, in effect, continuations of the inner portions of the plates, as such portions are relatively long as compared with the outer portions, as will be observed from an inspection of Fig. 3 of the drawings. Formed in the confronting faces of the circular plates 5, 5 and opening onto the periphery of such plates above and below the horizontal center line thereof are alining grooves 14 of a depth corresponding with the length of the headed pins 13 and having the upper ends thereof adapted to register with the notches in the inner edges of the annular disks 10, 10 successively and the lower ends thereof registering with such notches successively.

Seated upon the base 1 and secured to the marginal edges thereof and inclosing the name plates 11′ and the mechanism of the indicator is a casing 15 formed of a lower section 16 and an upper section 17 placed in edge to edge contact with the upper edge of the lower section and having a depending flange 18 overlapping the upper edge of the lower section so as to form a dustproof joint between the sections. At the cut out portion 2 of the base 1 the bottom section 16 of the casing is cut away to form a sight opening 19 disposed at a tangent to the path of movement of the name plates 11′, the supporting standards 4, 4 forming the end walls of the sight opening, 19, while the upper end of such opening is closed by means of a top wall 20.

In the present instance, the actuating mechanism for the shaft 6 comprises a ratchet wheel 21 fast upon one end of the shaft and a lever 22 pivoted between its ends upon the shaft adjacent to one face of the ratchet wheel. Pivoted upon the lever 22 at one end thereof is a dog 23 engaging the teeth of the ratchet wheel 21 and held in engagement by such teeth by means of a coiled contractile spring 24 having one end fastened to the dog and the opposite end secured to a supporting plate 25 carried by the outer edges of parallel standards 26 uprising from the base 1 within the casing. Pivoted upon the opposite end of the lever 22 is a dog 27 normally engaging the teeth of the ratchet wheel 21 and held in such engagement by means of a spring 28. Connected with the end of the lever 22 carrying the dog 27 projecting outwardly of the casing 15 by way of a vertical slot 29 in such casing is an operating handle 30 capable of vertical movement within the slot, while pivoted to the lever 22 adjacent to the dog 27 and depending therefrom is a rod 31 carrying, at its lower end, an armature 32 disposed within the influence of an electromagnet 33. By means of this construction, it will be seen that when the magnet 33 is energized the armature 32 and connecting rod 31 will be drawn downwardly with the effect to swing the lever 22 about the shaft and so rotate the ratchet wheel 21 and the shaft, while when the magnet is deënergized the spring 24 will react and restore the lever 22 and armature 32 to normal position, the dog idling over the teeth of the ratchet wheel in this movement of the lever. A spring pressed dog 34 is pivoted upon the plate 25 and normally engages the teeth of the ratchet wheel to prevent retrograde movement thereof in the movement of the lever 22 to normal position. In event of failure of the magnet 33 or the current for energizing such magnet, the hand lever 30 is manipulated to actuate the lever 32 and rotate the shaft 6 as previously described.

The end of the lever 22 carrying the dog 27 projects through a slot 35 formed in a plate 36 carried by one of the standards 26 and projecting outwardly therefrom and extending outwardly from the plate 36 below the slot 35 is a lug 37 formed with a vertical threaded opening through which is passed an adjusting screw 38 having the lower end thereof equipped with a manipulating head 39 whereby the upper end of the screw may be elevated and lowered to regulate the swinging movement of the lever 22 under the action of the electromagnet 33 or the handle 30.

In practice, as the shaft 6 is rotated in a step by step manner, under the action of the electromagnet, or the handle, alining notches 11 in the inner edges of the flanges 10 register with the upper ends of the guide grooves 14 successively thereby permitting the inner edges of the name plates to drop into the guide grooves and so relieve the lugs 12 of the influence of the notches in the confronting edges of the flanges 8. As the lugs are released the name plates or signs swing through an arc of a circle, as indicated by the dotted line in Fig. 4, and slide down the guide grooves 14 into the alining notches in the inner edges of the flanges 10 at the lower ends of the guide grooves, so that the indicia on the name plates of the sign plates may be read through the sight opening 19, the front face of the particular name plate in the sight opening forming, in effect, the back wall of the opening and preventing entrance of dirt and other foreign matter to the mechanism within the casing. The plates, when relieved of the influence of the holding notches in the confronting edges of the flanges 8, swing around before the pins 13 have advanced far in the grooves 14 and hence the lugs 12 are not interfered with in swinging by the standards 4, but fall behind such standards.

In the present instance, the upper portion of the casing 15 is equipped with a handle 40 whereby the device as an entirety may be readily transported from place to place, while the base 1 sets within the vertical limbs of angle brackets 41, such brackets having the horizontal limbs thereof fastened to an appropriate support whereby the indicator may be held in a convenient position.

From the foregoing description taken in connection with the accompanying drawings, the construction, mode of operation and manner of employing my improved indicating device will be readily apparent. It will be seen that I have provided an indicator which will operate effectively for its intended purpose and whereby the name plates will be brought into view singly and one after the other.

While I have herein shown and described one preferred form of my invention by way of illustration, I wish it to be understood that I do not limit or confine myself to the precise details of construction herein described and delineated, as modification and variation may be made within the scope of the claims without departing from the spirit of the invention.

I claim:

1. A station indicator comprising a horizontal shaft, circular plates disposed concentrically of said shaft and spaced apart thereon, annular disks fast to said shaft at the outer sides of said plates and formed with inwardly extending peripheral flanges disposed concentrically of said plates and spaced apart therefrom, the confronting edges of said flanges being formed with alining notches, an annular plate encircling each of said first plates and having the peripheral edge thereof secured to the flange on the adjacent disk and the inner edge formed with notches alining with those in the other plate, name plates arranged parallel with said shaft and each having outwardly projecting lugs formed on the opposite end edges thereof adjacent to the inner side edge and fitting within said alining notches in the flanges of said disks, pins projecting outwardly from the lugs and fitting within said alining notches in the inner edges of said second plates, said first plates having the inner faces thereof formed with a pair of alining grooves opening onto the periphery thereof above and below the horizontal center line of the plates to receive the pins in the notches in said second plates as such notches aline with the grooves whereby the lugs will be relieved of the influence of the first notches and the plates swing to an active position, and means for rotating said shaft.

2. A station indicator comprising a horizontal shaft, circular plates disposed concentrically of said shaft and spaced apart thereon, annular disks fast to said shaft at the outer sides of said plates and formed with inwardly extending peripheral flanges disposed concentrically of said plates and spaced apart therefrom, the confronting edges of said flanges being formed with alining notches, name plates arranged radially of said shaft and having the inner edges thereof parallel with the shaft and each having outwardly projecting lugs formed on the opposite end edges thereof adjacent to the inner side edge and fitting within the said alining notches in the flanges of said disks, pins projecting outwardly from the lugs and resting upon the peripheries of said circular plates, said plates having the inner faces thereof formed with a pair of alining grooves opening onto the periphery thereof above and below the horizontal center line of the plates to receive the pins as the latter aline with the grooves so that the lugs will be relieved of the influence of said first notches and the plates swing to an active position, and means for rotating said shaft.

3. A station indicator comprising a horizontal shaft, circular plates disposed concentrically of said shaft and spaced apart thereon, annular disks fast to said shaft at the outer sides of said plates and formed with inwardly extending peripheral flanges disposed concentrically of said plates and spaced apart therefrom, the confronting edges of said flanges being formed with alining notches, name plates arranged radially about said shaft and having the inner longitudinal edges thereof parallel with the shaft and each having outwardly projecting lugs formed on the opposite end edges thereof adjacent to the inner longitudinal edge, said lugs fitting within said alining notches in the flanges of said disks, projections extending outwardly from said lugs and engaging the peripheries of said circular plates, said plates having the inner faces thereof formed with a pair of alining grooves opening onto the periphery thereof above and below the horizontal center line of the shaft to receive said projections as the latter aline with the upper ends of the grooves so that the lugs will be relieved of the influence of said notches and the plates swing to an active position, and means for rotating said shaft.

In testimony whereof I affix my signature in presence of two witnesses.

JOHN WALTER.

Witnesses:
FERDINAND HOTTER,
FRANK W. KITE.

Copies of this patent may be obtained for five cents each, by addressing the "Commissioner of Patents, Washington, D. C."